United States Patent
Boubekeur

(10) Patent No.: US 7,676,771 B2
(45) Date of Patent: Mar. 9, 2010

(54) METHOD OF OPTIMIZING AN ELECTRICAL CABLING

(75) Inventor: Jean-Luc Boubekeur, Toulouse (FR)

(73) Assignee: Airbus France, Toulouse (FR)

( * ) Notice: Subject to any disclaimer, the term of this patent is extended or adjusted under 35 U.S.C. 154(b) by 758 days.

(21) Appl. No.: 11/097,276

(22) Filed: Apr. 4, 2005

(65) Prior Publication Data

US 2005/0271350 A1    Dec. 8, 2005

(30) Foreign Application Priority Data

Apr. 2, 2004    (FR)    ................... 04 03468

(51) Int. Cl.
*G06F 17/50*    (2006.01)

(52) U.S. Cl. ............................ 716/2; 716/12

(58) Field of Classification Search ........... 716/2, 716/12–15; 174/68.1, 250, 72 R, 72 A; 703/1
See application file for complete search history.

(56) References Cited

U.S. PATENT DOCUMENTS

| | | | | |
|---|---|---|---|---|
| 6,781,051 B1* | 8/2004 | Linossier | ...................... | 174/27 |
| 6,879,941 B1* | 4/2005 | Ehrenberg et al. | ............. | 703/1 |
| 6,886,152 B1* | 4/2005 | Kong | ........................... | 716/16 |
| 7,057,734 B2* | 6/2006 | Jacobs et al. | ................. | 356/460 |
| 7,194,720 B1* | 3/2007 | Borer et al. | .................... | 716/16 |
| 2001/0038612 A1* | 11/2001 | Vaughn et al. | .............. | 370/256 |
| 2003/0047997 A1 | 3/2003 | Bernier | | |
| 2005/0229141 A1* | 10/2005 | Kawa et al. | .................... | 716/17 |

FOREIGN PATENT DOCUMENTS

JP    11-272727    10/1999

* cited by examiner

*Primary Examiner*—Vutke Siek
(74) *Attorney, Agent, or Firm*—Oblon, Spivak, McClelland, Maier & Neustadt, L.L.P.

(57) ABSTRACT

In this optimization procedure for the cabling, the characteristics of the cables used to connect a power source to a receiving charge are defined in function of the predetermined and environmental constraints. In the cases where a line realizing the link between the power source and the receiving charge is comprised of several distinct cables connected through cutouts, the section of cables is dimensioned for each cable in the line, independently of the other cables, and is then optimized while taking the overall constraints of the line into account.

18 Claims, 3 Drawing Sheets

METHOD OF OPTIMIZING AN ELECTRICAL CABLING

CROSS-REFERENCE TO RELATED APPLICATIONS

This application claims priority to French Application No. 04 03468, filed Apr. 2, 2004, the entire content of which is hereby incorporated by reference.

BACKGROUND OF THE INVENTION

1. Field of the Invention

The present invention concerns an optimization procedure for the electric cabling, more specifically, in the field of aeronautics.

2. Discussion of the Background

In aircrafts, the number of systems installed on board continuously increases over time. This increase is aimed at obtaining airplanes that are safer and better in performance. However, it leads to an increase in the number of cables that are present in an aircraft. With time, this implies the constant growth in the mass of electrical cables installed on board of an airplane.

This supplementary mass installed on board is a handicap for any given aircraft. When the no-load weight of the aircraft is increased, then one must either provide for a more powerful engine or reduce the pay load. In any case, the figures will show that the aircraft's fuel consumption increases when broken down for each individual passenger being transported or for each ton being shipped, thus leading to a rise in costs for operating the aircraft.

SUMMARY OF THE INVENTION

The present invention therefore has the objective of providing the means, for a given aircraft, that allow for limiting the mass of electrical cables required for the cabling of the various systems in the aircraft without, however, limiting the number and/or the positioning of said cables.

To this end, the invention proposes an optimization procedure for the cabling in which the characteristics of the cables used to connect a power source to a receiving charge are defined in function of the predetermined and environmental constraints.

According to the invention, in the cases where a line realizing the link between the power source and the receiving charge is comprised of several distinct cables connected through cutouts, the section of cables is dimensioned for each cable in the line, independently of the other cables, and is then optimized while taking the overall constraints of the line into account.

In an original manner, the invention proposes here, that a line connecting a power source to a receiving piece of equipment not be considered as a sectional line that is constant, but rather as a sectional line that is variable. In this manner, it is possible to limit the section of cables that is used over certain parts of the line, while it is not possible, in contrast, to reduce a section over the entirety of the line.

To best determine the section of cables to be used, the invention proposes in a preferred form of embodiment, prior to making the determination as to which section of cables to use, that the routing of the lines and cables be effected so as to allow for the calculation of the path to be taken by the various lines and cables. Thus, the knowledge of the path taken by the cables allows for a better optimization of the line since it is then possible to determine the type of cable being used (shielded or not, resistant to such and such a temperature, etc.). In the case of preliminary routing, said routing of lines and cables preferably allows for at least determining the approximate positioning of the cutouts separating two adjacent cables. In this manner, the length of each cable is known and the mass of the cables can better be determined.

In a form of embodiment of the optimization procedure in accordance with the invention, for at least one cable of a line, several sections of usable cables are determined in function of the constraints imposed upon said cable; these cables are combined according to different combinations so as to form one line; verification is made for each line as to whether the overall constraints of the line have been satisfied, and the line that has the lowest mass and corresponds to the overall technical constraints is the one selected.

All of the characteristics of the different varieties of cables that might be used for implementing the cabling under consideration are advantageously memorized in a data base. The term "variety" is used here as distinct from the term "type" of cable, described further below. The type of cable denotes its general structure (in the electrical field, there are for example, shielded cables, non-shielded cables, cables with one or several wires, with an insulator of such and such a material, etc.). Variety, here, also concerns the section of the cable. Thus, two cables of the same variety simultaneously present with a same section and are of the same type.

The optimization of the overall mass of the cables is preferably realized for two discrete variables, for the type and for the section of the cables.

The present invention is particularly well suited to be applied for the implementation of electric cabling. In this case, the predetermined constraints include, for example, a value for the maximal intensity, defined, among other things, by the consumption of the load and by a permissible maximal drop in voltage. In this electrical field, the environmental constraints include, for example, the ambient temperature.

The invention also concerns:

a computer program stored on a data storage medium, said program comprising instructions allowing for the implementation of an optimization procedure such as the one described above, when said program is downloaded and executed by a data processing system, a data processing system characterized in that it comprises the means adapted to implement a procedure such as the one described above, and a data storage medium that is readable by a data processing system, possibly entirely or partially interchangeable, more specifically a CD-ROM, DVD-ROM or a magnetic medium, such as a hard disc or a floppy disc, or a transmittable medium, such as an electric signal or an optical signal, characterized in that it is comprised of instructions from a computer program allowing for the implementation of a procedure such as the one described above, when said program is downloaded and executed by a data processing system.

BRIEF DESCRIPTION OF THE DRAWINGS

The details and advantages of the present invention shall become clearer based on the following description made in reference to the appended schematic diagram in which.

DESCRIPTION OF THE PREFERRED EMBODIMENTS

Figure 1:
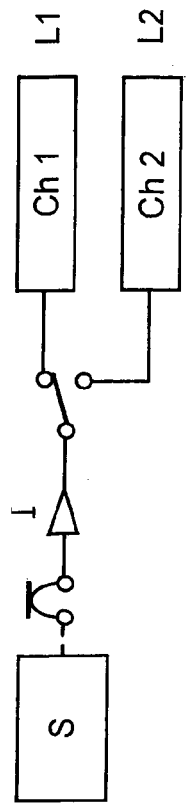
FIG. 1 schematically represents a circuit of the switch-over type.

The drawing illustrates the utilization of a procedure in accordance with the invention for the implementation of the electric cabling in an aircraft. A similar procedure can be used in applications other than in aeronautics.

The following description shows how, in accordance with the invention, it is possible to reduce the overall mass of the cables in an electric network. In aircrafts, the increase in the number of systems installed on board as well as the increase in power consumption by multiple units of equipment in the aircraft lead to an increase in the mass of the electrical installations in the aircraft. To limit this increase, the invention proposes to optimize the mass of cables which connect the various systems installed on board and which supply power to the multiple units of equipment.

Of course, the optimized electrical network obtained must satisfy all of the safety standards without acting upon the levels of power consumed, nor on the number of systems installed on board, nor on their positioning.

In the state of the art prior to the present invention (FIG. 4), when a power source S supplies a charge Ch, the overall architecture of the function is defined. The analysis of the load specification (equipment) provides a maximal power consumption that is expressed in amperes. Taking into account the position of the power source S and of the charge Ch, as well as the various obstacles possibly located between said power source S and said charge Ch, the length of the route is established. In the example from FIG. 4, this length is L=60 m. Taking into account the maximal power consumption of the charge Ch, a cutout switch (or such similar), represented here in association with the power source S, limits the maximal intensity in the cable C1 that connects the power source S to the charge Ch. In the present case, the maximal power consumption of the charge C is 45 A and the cutout switch is provided for cutting out at 50 A. In the present case, there is a predetermined technical constraint. The drop in voltage (loss in charge) in the cable C1 must be less than 4 V (or $\Delta Vmax=4$ V).

It is now appropriate to determine the type and gage of the cable C1. The type of electric cable is coded. The indication of the cable type allows us to more specifically know the number of conductors comprising the cable, the material used for the embodiment of the conductors, the nature of the insulating material as well as the possible presence and nature of the shielding. The gage of the cable, symbolized by the symbol #, is expressed as per the AWG (American Wire Gage) standard. The value of the gage decreases when the section of the conductor, and therefore its ohmic resistance, increases.

Figure 4:
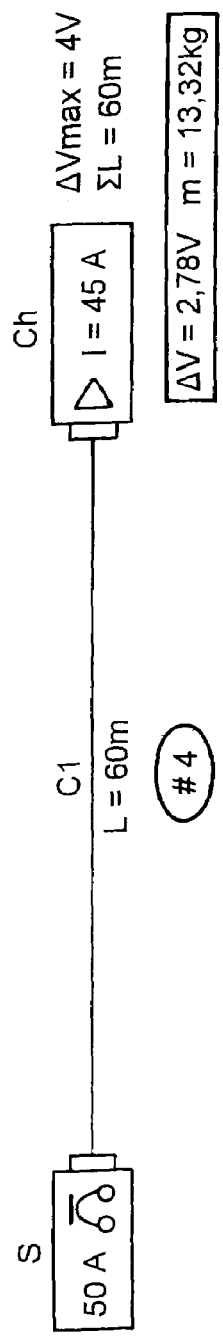
FIG. 4 illustrates the choices for the type and gage of cables available in the state of the art prior to the present invention.

In the present case, illustrated in FIG. 4, when the rating of the cutout switch is 50 A, the maximal cable gage (that is to say, the minimal section) for cable C1 is #8 made of aluminum material and #10 made of copper material. Taking the different constraints into account ($\Delta V$ for example) and being mindful not to needlessly increase the mass of the cables, one then selects a gage #4 cable.

After this, once all of the elements have been defined (power source, cable, equipment), the electric harnesses are defined. The electricians then define the theoretical path of the functional routing linking the various pieces of equipment of the aircraft. The type of cables at the level of each harness is then determined in function of the path that is retained. The type of cables is determined in function of the environmental constraints (temperature, for example), of the specifications from the functional diagram, and of the planned connectors, etc. Lastly, a final manual check permits to ensure that the definitions chosen do correspond to the required specifications.

The present invention proposes a novel and original manner by which to define an electrical network, as described in the following.

First of all, as in the previous, the architecture of the system is created. The data relative to the signals (voltage, current, . . . ) as well as the specific requirements which must be met by the circuit (maximal drops in voltage, specific thermal constraints, . . . ) are defined.

In a second step, and the positioning of the equipment having been defined, the electric harnesses are composed by determining their specific length. The routing for the functional connections can then be realized. At this point, one can as yet not speak of a physical routing since the gages and types of cables have not yet been determined. However, the paths that can be taken by the various cables are known. It is then a question of calculating the length for each one of them based on the data available. Said data are preferably stored in a numerical data base which constitutes a three dimensional numerical "model" of the airplane.

In the following step, the gages and types of cables are calculated. The totality of the electrical, technical (cable materials, connecting devices, . . . ) and thermal constraints is taken into account to ensure good and accurate dimensioning of the cables. It is to be noted here, that the gages of the cables are calculated after routing of the cables. The determination of the gages for the various cables is then optimized to reduce the overall mass of the cable network. The present invention more specifically concerns this last step of determination of the cable gages and the optimization thereof.

Before detailing an example for the determination of the cable gages in accordance with the invention, we are providing a few definitions for the words used in the following.

An electrical network is a set of several power sources connected through to several charges, said power sources and charges being connected through by cables while possibly being implemented by components (cutout, diode, . . . ).

A line is a logical subset of a network involving a single power source and a single charge and comprising one or several cables as well as possibly one or several components. A line is a unique combination of cables and of equipotentials connecting the power source to the charge.

Figure 2:
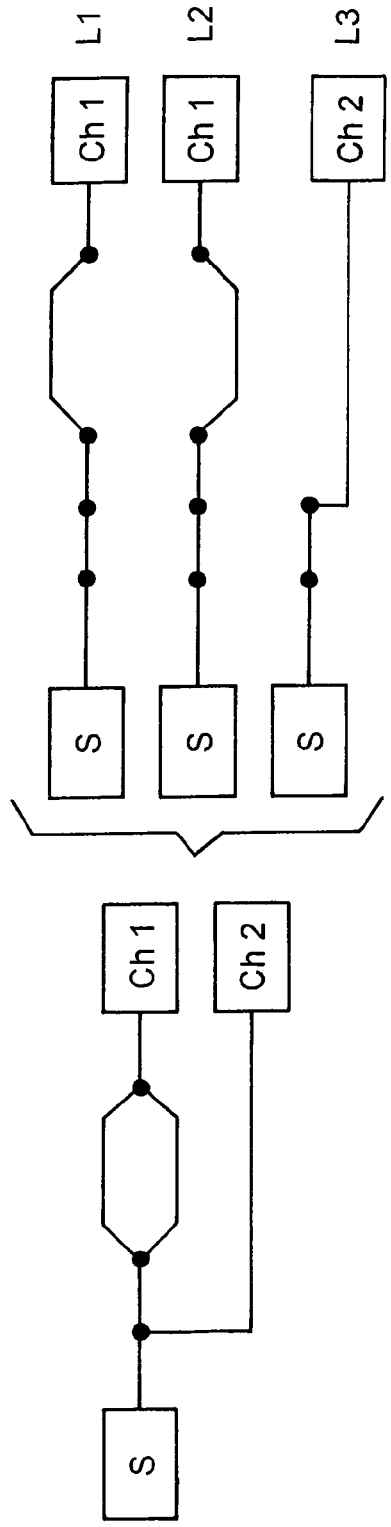
FIG. 2 illustrates the segregation of an electrical network into lines.

FIG. 2 illustrates the breakdown of a simple network into several lines. Each line is comprised of a power source and of a charge. Let us first consider the power source S and the charge Ch 1. One shall note that two distinct electrical paths connect the power source S to the charge Ch 1. One must therefore consider two electrical lines which are designated as L1 and L2, on the right side of FIG. 2. Upon then considering the power source S and the charge Ch 2, one shall note that just a single electrical path connects these two elements. This path thus forms the line we choose to designate as L3.

In the case of a switch-over network, as illustrated in FIG. 1, one takes into account the various positions of the change-over switches. In the example represented here, where a power source S is switched between two charges Ch 1 and Ch 2, one segregates the represented network into two lines L1 and L2.

To determine the gages of the cables, different constraints must be taken into account.

First of all, there are the electrical constraints. The gage of the cable must be compatible with the rating of the cutout switch in order to protect the line from heating up to a critical temperature when traversed by the current. It is also desirable to limit the drops in voltage over the line ($\Delta V max$) in order to ensure the proper operation of the equipment. These drops in voltage are determined in advance and in function of the pieces of equipment supplied by the power source.

After this, there are the thermal constraints. To prevent all risks of overheating in the cables or of premature wear of the installed electrical system, one must more specifically take into account dissipation as a result of the Joule effect, the ambient temperature as well as the cooling conditions (confined or liberated air, etc.).

Finally, there are the technological constraints. The insulating materials used for the cables are not all resistant to the same temperatures. The choice of insulating material will directly depend on the thermal constraints. The conductive material (aluminum or copper) in an airplane depends on the zone of the airplane in which the cable is intended to run. In fact, in order to avoid possible contamination, the use of aluminum cables is restricted to specific zones in the airplane. Specific constraints (for example, the use of a three wire shielded cable) also influence the type of cable to be used. One must also take into account the permissible bending radius of the cable for its application. This restricts the usage of certain types of cables in confined spaces. The type of cable chosen must also take into account the connecting terminal to which it must be linked.

Figure 3:
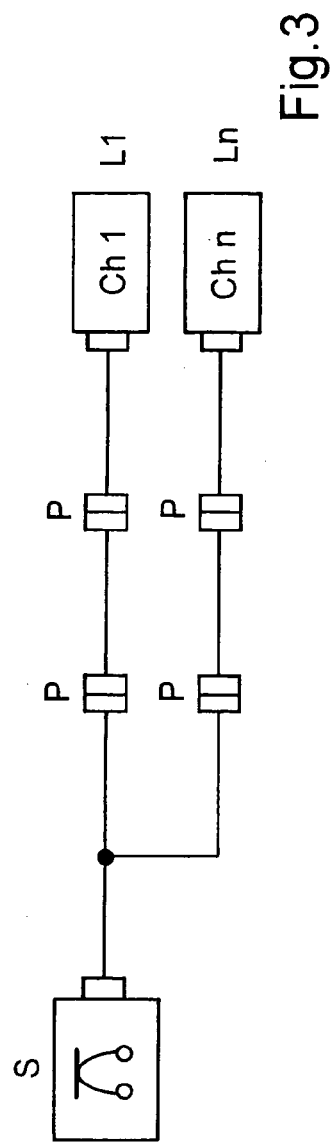
FIG. 3 shows a simplified representation of a network, such as the one from FIG. 2, for example, after routing.
Figure 5:
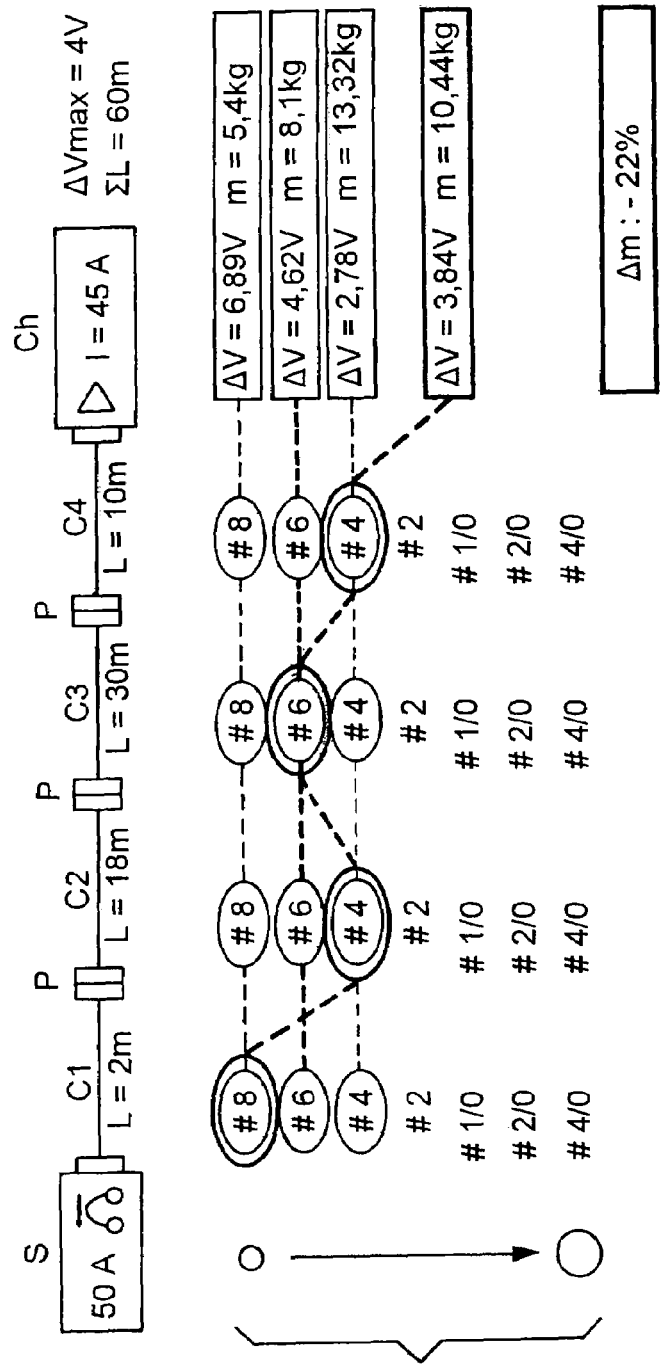
FIG. 5 illustrates the choices for the type and the gage of cables in the example represented in FIG. 4 when using a procedure in accordance with the invention, FIGS. 6 through 8 schematically illustrate three steps of a procedure in accordance with the invention.

FIG. 5 illustrates the choice of gages for cables on a line with the same power source S and charge Ch from FIG. 4. In FIG. 5, one shall note that there is no longer just one cable between the power source S and the charge Ch 1 but rather four cables designated as C1, C2, C3, and C4. These cables respectively measure 2 m, 18 m, 30 m and 10 m. We therefore have a total length ($\Sigma L$) of 60 meters. In each case, a cutout P separates two adjacent cables (as shown in FIG. 3).

The constraints remain the same as before (FIG. 4). The cutout switch is set off at 50 A. As a result of this, it is possible to select for each one of the cables, C1 through C4, gages that range from # 8 to # 4/0 in a copper material and from # 6 to # 3/0 in an aluminum material. In FIG. 5, we considered the cables C1 to C4 to be of copper.

In FIG. 5, we represented opposite each cable C1 through C4 the various gages that were permissible a priori. These gages are classified by their order of increasing mass as indicated by the arrow on the left of the figure.

To the right of the figure are indicated the drops in voltage ($\Delta V$) for four examples of cable combinations. The first combination corresponds to four cables with a # 8 gage. This combination yields a maximal drop in voltage $\Delta V$ of 6.89 V. This solution is therefore not permissible since the drop in voltage is limited to 4 V. Likewise, if all of the cables C1-C4 have a # 6 gage, the voltage drop $\Delta V$ is 4.62, which is not acceptable. With four cables having # 4 gages, we have the solution presented by the prior art that is illustrated in FIG. 4. The drop in voltage $\Delta V$ is 2.78 V. The overall mass of the four cables C1 through C4 then specifically amounts to 13.32 KG. However, other combinations can be considered while selecting cables with different gages. The preferred combination retained here is that of cable C1 with a # 8 gage, cable C2 with a # 4 gage, cable C3 with a # 6 gage and cable C4 with a # 4 gage. This combination provides a maximal drop in voltage $\Delta V$ of 3.84 V for a mass of 10.44 KG. We shall therefore note that the difference in cable mass between this preferred combination and the gages for the cables from the prior art is calculated to be 22%.

Figures 6, 7, 8:
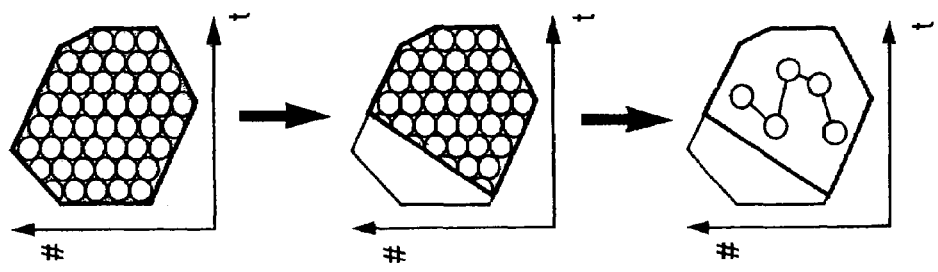

FIGS. 6 through 8 illustrate this optimized determination of the cable gages. In these figures, the type t of the cables is represented by the abscissa and the gage # by the ordinate. In FIG. 6, we represent all of the cable types and gages which may be suitable when one takes into account only the constraints relative to the current that is to circulate through the cable, relative to the environment in which the cable is located (copper or aluminum), the thermal constraints, as well as the constraints in terms of connections. One then obtains a large number of possibilities. In the example from FIG. 5, these possibilities correspond to all of the cable gages indicated. Once the valid cables have been selected, one need only verify whether the specifications have been met in terms of the drop in voltage. The choice of cables then becomes restricted, as illustrated by FIG. 7. Finally, when the mass of the cables has been optimized, only a few cables qualify for being retained, as illustrated in FIG. 8.

In the example from FIG. 5, the problem of optimizing the mass is a problem of discrete optimization (gages/types of cables) under constraint (drop in voltage on the line). The difficulty of such a problem is considerably magnified when the optimization is intended for an entire network as opposed to just for one line. Such a network can be laid out schematically, for example, as in FIG. 3. A power source S associated to a cutout switch is connected to several charges Ch 1 through Ch n, thus forming a set of lines L1 through Ln.

Taking into account the vast number of cables present in a modern aircraft, a simultaneous optimization calculation for all of the cables would seem difficult to realize since it would call for means of calculation far too considerable. However, we can distinguish several networks that are more or less independent of one another in an aircraft. An optimization of the mass can be realized on a network by network basis.

Figure 9:
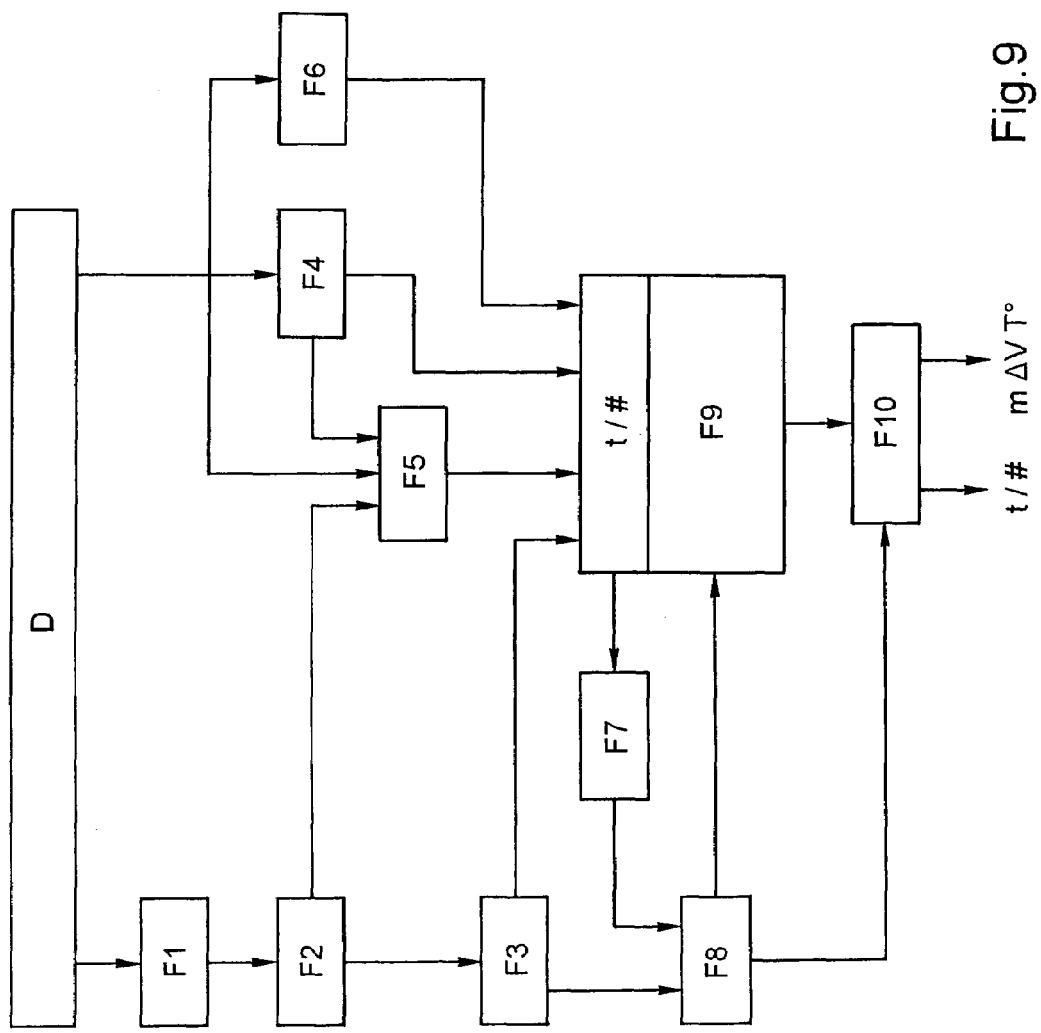
FIG. 9 is a flow chart corresponding to an algorithm for the implementation of a procedure in accordance with the invention.

FIG. 9 shows, in the form of a diagram, an algorithm for the calculation of how to obtain an optimization of the gages and types of cables in a network.

The different types of information required for defining the electrical network in an aircraft are regrouped in a data base D. This data base D symbolizes the various types of information available concerning the architecture of an aircraft. They are not necessarily regrouped in one same physical data base. We can even assume that some of the information required for the calculation revealed hereinafter is not available in a numerical form, but must be acquired instead.

The function F1 allows for the construction of lines. Based on a switch-over network such as the one in FIG. 1, said F1 function automatically selects the different states of the switch-over components and therefore seeks out the set of components allowing for constituting an electric line.

The function F2 calculates, for each component on the line, the maximal currents "Imax" in order to more specifically dimension the cables in terms of temperature and to calculate the rating of the cutout switch.

The function F3 calculates/verifies the rating of the cutout switch. If the technical specifications for the cutout switch have not been specified, then the cutout switch presenting with the minimal ohmic resistance is selected at the level of this F3 function. At this particular level, one can already calculate the cable gages that are compatible with the rating of the cutout switch.

Based on the data D, the function F4 can calculate the most constrained environment to which a predetermined cable is subjected. The rules of the trade, defined by a standard, impose a choice for the cable types and gages that is in function of the airplane's environment through which the cable is routed. One same cable can traverse airplane zones that have different characteristics (pressurized or non-pressurized zone, different ambient temperature, etc. . . . ). Here, we also obtain a set of cable types/gages that are compatible.

The function F5 allows for the calculation of thermal constraints. This calculation has already been realized in the prior art. Depending on the data provided at input, different methods can be used. Let us simply recall that the thermal constraints are essentially dependent on the maximal ambient temperature, on the intensity of the current running through the cable as well as on the cable's position in the aircraft.

The function F6 calculates the constraints for the connecting devices. Here, the system user making use of the algorithm in FIG. 9 has access, for example, to a table that evaluates the connecting elements that may be used. In function of the elements selected, function F6 calculates the cable types/gages that are compatible. One can imagine a graphic interface at the level of this function F6 which allows the user to visualize the connecting device elements that are selected.

The results of calculations from the functions F3, F4, F5 and F6 yielding a set of valid types and gages are regrouped at the level of the cell bearing the designation t/# in FIG. 9.

After this, one calculates (function 7) the currents "Idim" that allow for the dimensioning of the cables under the ΔVmax constraint. Here, the cable is no longer considered in isolation, but rather as an element of the line Li in which it is integrated and where it contributes to a drop in voltage ΔVi. Thus, for the line Li, the value "Idim" corresponds to the intensity of the current causing the maximal drop in voltage ΔVi.

The function F8 allows for the calculation of the maximal drop in voltage that is permissible in the cables while equally taking into consideration the intermediary drops in voltage due to the presence of components (cutout switch, diode, etc. . . . ).

The function F9 determines the valid cable types/gages prior to optimization. In function of the set of constraints previously defined, the function F9 calculates the solutions (types/gages) that are valid for each of the cables in the network. Here, one verifies, for each one of the cables in the line, that the constraint for the maximal drop in voltage (ΔVmax) is not exceeded. In this manner, one is reducing the set of solutions at the input of the optimization algorithm.

Finally, the function F10 is the function which allows for the optimization of the cable types/gages. Schematically, the functions F1 through F8 allow for the determination of the set of type/gage couples that are permissible in FIG. 6. The function F9, in and of itself, allows us to pass on to the type/gage couples represented in FIG. 7. Finally, the function of optimization F10 allows us to retain only the types and gages presented in FIG. 8.

The objective of the optimization problem is to minimize the mass of the network. Mathematically, we can formulate this by indicating that the overall mass is the sum of the mass of the cables. We know that theses masses depend on the type of cables, on the gage of the cables and on the length thereof. Since the overall length of the cable is constant for a given line, the optimization can be done for the two discrete variables which consist in the types and sections (or gages) of the cables.

This sum must be minimized by the constraints.

As the first constraint, one expresses that for each cable in a line, the type of cable is restricted by the zones to be traversed in the airplane. In this constraint, one can also express the number of wires that must be comprised in each cable.

The second constraint is associated to the value of "Imax". For each cable, the maximal gage is restricted by the rating of the corresponding cutout switch as well as by the heating constraint based on the Joule effect in the cable. However, this restriction is not always the same and depends on the material used for the cable. Being that the material is associated with the type of cable, one must enter the two variables in this constraint. Furthermore, depending on the types of cables used, not all of the sections are available and there may exist yet another constraint due to the type of connecting devices. For each cable, one can therefore indicate that its section (corresponding to its gage) is greater than (or equal to) a minimal section, depending on the type of cable and on the connecting devices, and is less than (or equal to) a maximal section, depending on the cutout switch, on heating, on the type of cable and on the connecting devices.

As a third constraint, it is appropriate to consider the drops in voltage in the lines. For each line, we want the drop in voltage over the set of cables not to exceed a maximal value ΔVmax. This maximal value takes into account the drop in voltage over the entire line, including the cables and the components. Therefore, in a given line, the sum of the drops in voltage calculated must be less than the permissible maximal value ΔVmax.

Mathematically, it is therefore appropriate to minimize the function for the masses while taking into account the three constraints mentioned above. The formulation of the equation for this problem is directly deduced from that which preceded. The resolution of the system of equations formulated in such a manner is a classical problem with which the person skilled in the art normally knows how to deal.

For this precise problem, we can provide a few indications concerning the resolving algorithm. Thus, for example, instead of using the cable gages as a discrete variable, we can assimilate them to continuous functions such as to the resistance and/or to the mass per unit length in function of the section of cable. This device allows for the use of classical optimization methods and algorithms that are based on the derivation of functions.

However, if rendering the cable section continuous corresponds to a physical reality, the same cannot be said of the type of cable. In order to increase the chances of convergence towards an overall minimum, the resolving algorithm is called into execution several times with different points of initiation each time. We estimate that such a procedure allows us to find a solution that is down graded by at least 10% in terms of the optimal solution.

The procedure which is best adapted to the traditional algorithm in mathematics is the one designated as the algorithm of separation and evaluation (also known under the English name of branch & bound). It allows for the identification of the overall minimum of the solutions but the resolution time increases exponentially in function of the size of the problem whose volume rapidly becomes sizable. The continuous optimization suggested here in the preceding allows for facilitating the quest for solutions.

The use of the procedure described above, as a prototype, has allowed us to realize significant progress in terms of mass.

This procedure therefore allows for a significant reduction in the mass of cables put into application while respecting the same constraints used in the prior art (electrical constraints, thermal constraints, connecting device constraints, etc. . . . ) without altering the previously defined architecture of the electrical network in the aircraft.

A personal computer can be used for the application of this procedure. Programming with classical spreadsheet software can even be considered.

The optimization of the cable gages and types is implemented while taking into consideration all of the segments of a functional route and not just exclusively one single route between two pieces of equipment. The procedure described above allows for automatic dimensioning of the cables. In fact, this dimensioning is a complex exercise which requires in depth professional experience in the art of design. When the lengths of the cables change, long and tedious calculations are required for redimensioning the cables. Such a problem is frequently encountered over the course of development of a new aircraft. In fact, the definition for the electrical harnesses changes on a regular basis over the course of the design for this new aircraft. The automatic calculation proposed by the invention allows for rapidly measuring the effects of a change in routing or of a change in the technical specifications of the cable gages and equally allows for validating whether all of the constraints have been met.

The present invention is not limited to the preferred form of embodiment described above which serves as an example without any limitations. It also concerns all of the variations in embodiment which are within reach of the person skilled in the art in the context of the claims that follow here.

What is claimed as new and desired to be secured by letters patent of the United States is:

1. A method of optimizing cabling, which is implemented by a data processing system, the method comprising:
    defining, with the data processing system, characteristics of a line connecting a power source to a receiving charge as a function of constraints of the line that are predetermined and environmental,
    dividing, with the data processing system, said line into several distinct cable segments connected in series to each other via a plurality of cutouts such that each cutout separates two adjacent cable segments connected in series to each other via said cutout,
    selecting, with the data processing system, a gage for each individual cable segment in the line so as to optimize said cabling while taking the constraints of the line into account by determining for at least one cable segment. several gages of usable cables based on the constraints,
    combining said cable segments according to different combinations of said gages in order to form one line,
    verifying for each line whether the constraints have been satisfied for the line, and
    selecting gages for each cable segment of said cable segments so that the line has a lowest mass.

2. A method in accordance with claim 1, wherein, prior to said selecting of the gage, the method comprises routing of the line and cable segments so as to calculate a path for the line and cable segments.

3. A method in accordance with claim 2, further comprising determining at least an approximate positioning of the cutouts that separate the cable segments based on said routing.

4. A method in accordance with claim 1, further comprising storing characteristics of different varieties of cable segments configured to be used for implementing the cabling in a data base.

5. A method in accordance with claim 1, wherein said selecting comprises optimizing overall mass of the cable segments for two discrete variables, for a type and for the gage of the cable segments.

6. A method in accordance with claim 1, wherein said cabling is an electrical cabling.

7. A method in accordance with claim 6, wherein the predetermined constraints include a maximal intensity value defined by a cutout switch and by a maximal permissible drop in voltage.

8. A method in accordance with claim 7, wherein the environmental constraints include the ambient temperature.

9. A method in accordance with claim 1, wherein said line comprises at least a first cable segment and a second cable segment connected in series to each other via one of said cutouts, and wherein said selecting of said gage comprises selecting a first gage for said first cable segment and selecting a second gage for said second cable segment, wherein said first and second gages are different from each other.

10. A method in accordance with claim 9, further comprising selecting a type of cable for each of the cables in said line, wherein the type of cable for a cable segment is defined by the cable's shielding and insulating properties, the cable's materials and the cable's number of wires, and wherein said selecting of said type of cable comprises selecting a first type of cable for said first cable segment and selecting a second type of cable for said second cable segment, wherein said first and second types of cable are different from each other.

11. A method in accordance with claim 10, wherein said selecting of said gage and said selecting of said type of cable are performed so as to minimize the line's mass.

12. A method in accordance with claim 10, wherein said environmental constraints are specific to an aircraft environment.

13. A method in accordance with claim 9, wherein said selecting of said gage is performed so as to minimize the line's mass.

14. A method in accordance with claim 1, further comprising selecting a type of cable for each of the cable segments in said line, wherein the type of cable for a cable segment is defined by the cable's shielding and insulating properties, the cable's materials and the cable's number of wires, wherein said line comprises at least a first cable segment and a second cable segment connected in series to each other via one of said cutouts, and wherein said selecting of said type of cable comprises selecting a first type of cable for said first cable segment and selecting a second type of cable for said second cable segment, wherein said first and second types of cable are different from each other.

15. A method in accordance with claim 1, wherein a maximum current for each segment of said line is computed during said optimizing of said cabling.

16. A method in accordance with claim 1, wherein in said selecting said gages, thermal constraints including ambient temperature and thermal dissipation as a result of the Joule effect are considered.

17. A computer-readable storage device encoded with a computer executable code for implementing a method of optimizing cabling, the method comprising:
    defining characteristics of a line connecting a power source to a receiving charge as a function of constraints of the line that are predetermined and environmental;
    dividing said line into several distinct cable segments connected in series to each other via a plurality of cutouts such that each cutout separates two adjacent cable segments connected in series to each other via said cutout;

selecting a gage for each individual cable segment in the line so as to optimize said cabling while taking the constraints of the line into account by determining for at least one cable segment, several gages of usable cables based on the constraints;

combining said cable segments according to different combinations of said gages in order to form one line;

verifying for each line whether the constraints have been satisfied for the line: and selecting gages for each cable segment of said cable segments so that the line has a lowest mass.

18. A data processing system configured to optimize cabling, comprising:

a definition unit configured to define characteristics of a line connecting a power source to a receiving charge as a function of constraints of the line that are predetermined and environmental;

a dividing unit configured to divide said line into several distinct cable segments connected in series to each other via a plurality of cutouts such that each cutout separates two adjacent cable segments connected in series to each other via said cutout; and a selection unit configured to select a gage for each individual cable segment in the line so as to optimize said cabling while taking the constraints of the line into account by determining for at least one cable segment, several gages of usable cables based on the constraints, to combine said cable segments according to different combinations of said gages in order to form one line, to verify for each line whether the constraints have been satisfied for the line, and to select gages for each cable segment of said cable segments so that the line has a lowest mass.

* * * * *